Nov. 10, 1942.  A. E. KRICK  2,301,292
TORQUE CONVERTER
Filed Aug. 25, 1933  3 Sheets-Sheet 1
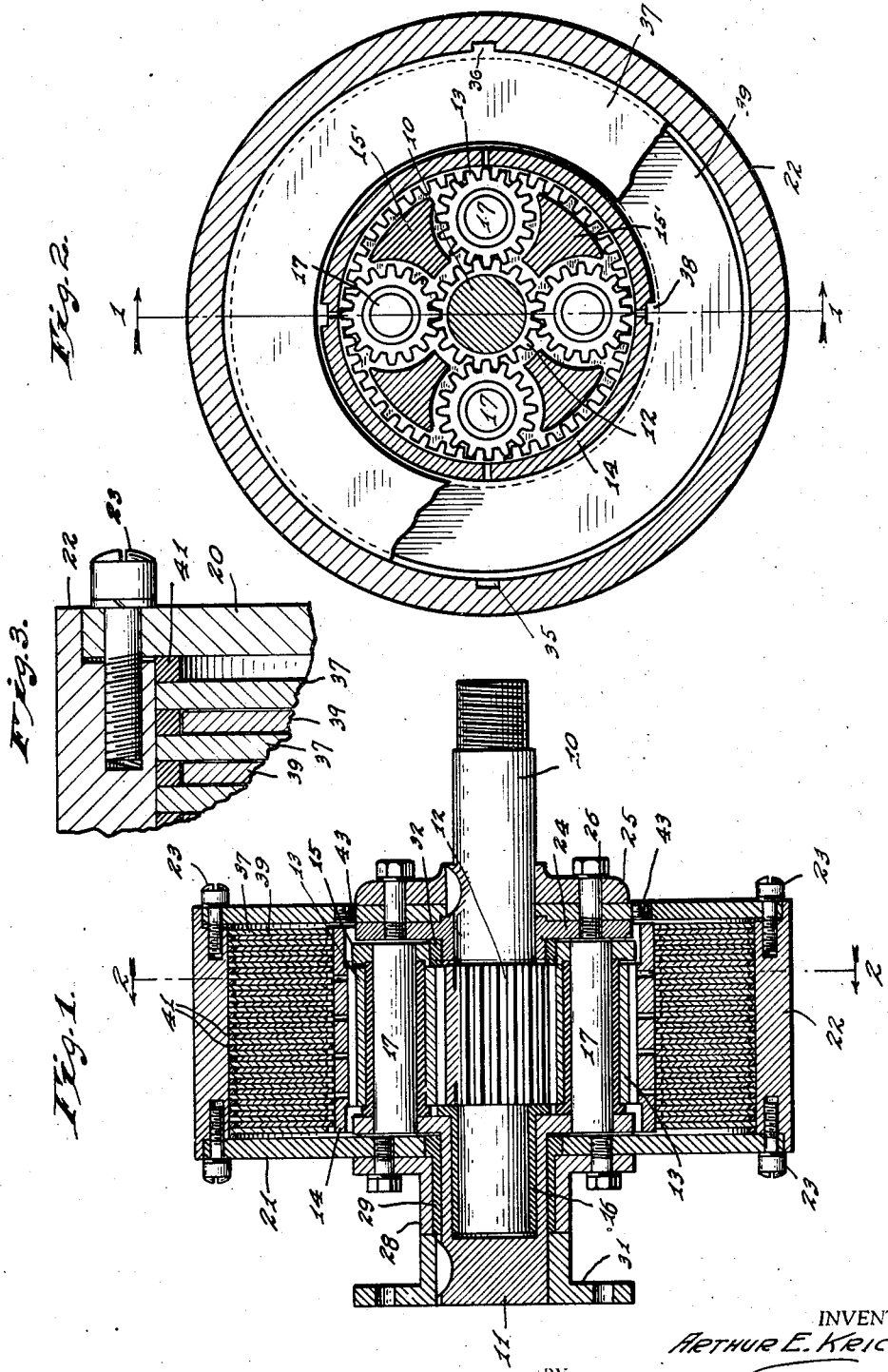
INVENTOR.
ARTHUR E. KRICK,
BY
ATTORNEYS.

Nov. 10, 1942.   A. E. KRICK   2,301,292
TORQUE CONVERTER
Filed Aug. 25, 1938   3 Sheets-Sheet 2
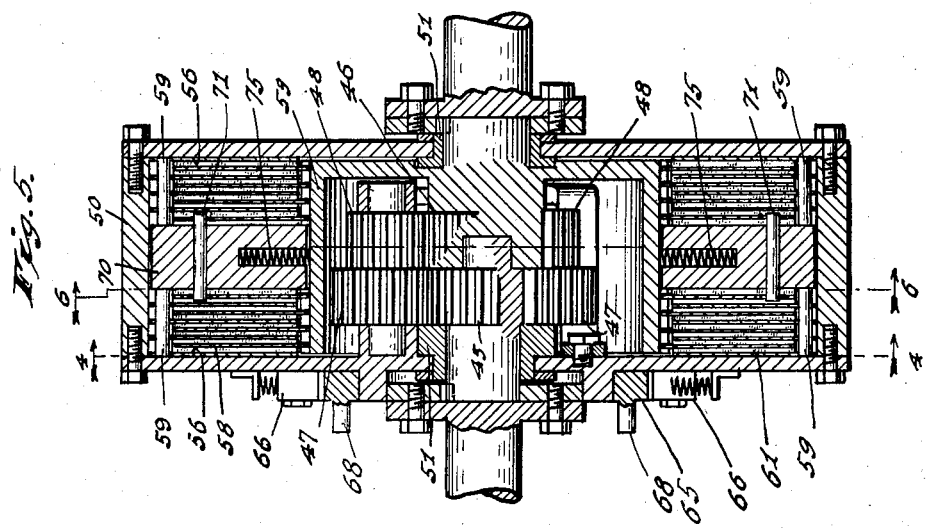
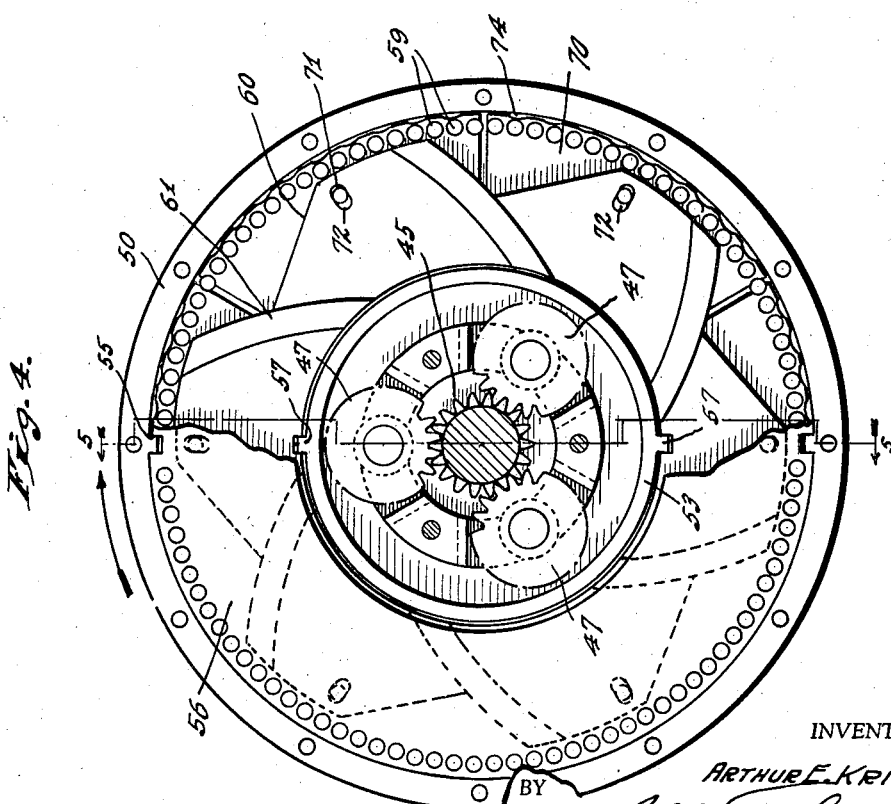
INVENTOR.
ARTHUR E. KRICK,
BY
ATTORNEYS.

Nov. 10, 1942.   A. E. KRICK   2,301,292
TORQUE CONVERTER
Filed Aug. 25, 1938   3 Sheets-Sheet 3
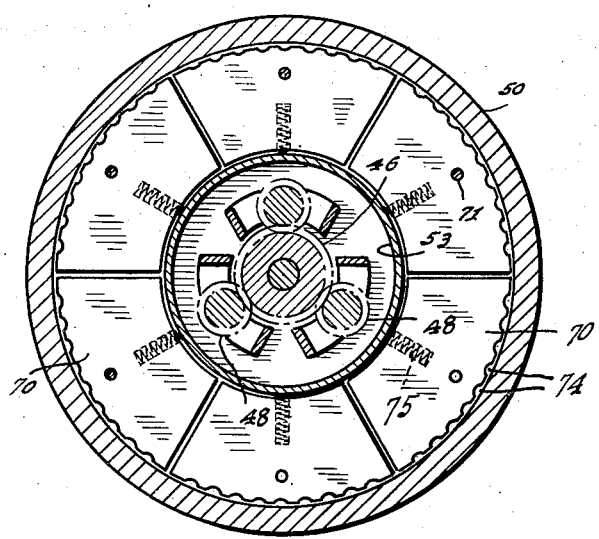
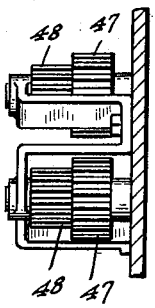
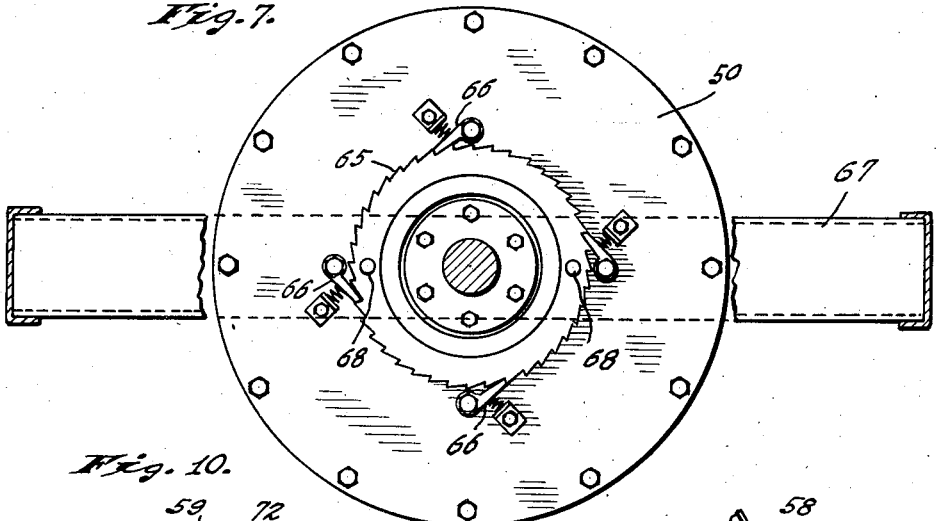
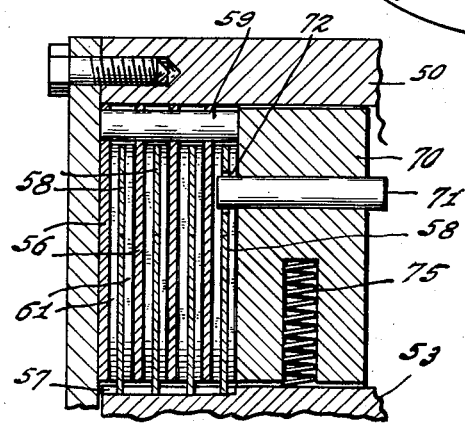
INVENTOR.
ARTHUR E. KRICK,
BY
ATTORNEYS.

Patented Nov. 10, 1942

2,301,292

UNITED STATES PATENT OFFICE 2,301,292

TORQUE CONVERTER

Arthur E. Krick, Indianapolis, Ind.

Application August 25, 1938, Serial No. 226,675

2 Claims. (Cl. 192—57)

It is the object of my invention to produce a torque-converter, or a device by which torque can be gradually applied to a static load. A further object of my invention is to produce a device of this kind which, without being inordinately large, will still have a high capacity. A more specific object of my invention is to produce a combined torque-converter and reduction gear which will be suitable for use in an automobile.

In carrying out my invention, I employ a conventional form of planetary gear-set comprising three relatively rotatable, coaxial elements operatively interconnected by planet pinions. One of these elements is made the driving element, another the driven element, and the third is connected to one of the other two by a fluid brake which opposes relative rotation of the two elements between which it acts with a force which is proportional to their relative speed. In a device for installation in an automobile, I arrange the device in a manner such that when the driving element is rotating and the driven element is stationary the third element will tend to rotate in a direction opposite to that in which the driving member rotates; and I desirably incorporate in the device some means for preventing such reverse rotation of the third element. The fluid brake employed may take the form of a series of coaxial plates immersed in a fluid, such as oil, and connected for rotation alternately to the two elements between which the brake acts.

The accompanying drawings illustrate my invention: Fig. 1 is an axial section on the line 1—1 of Fig. 2; Fig. 2 is a transverse section on the line 2—2 of Fig. 1; Fig. 3 is a fragmental view similar to Fig. 1 but on an enlarged scale; Fig. 4 is a transverse section on the line 4—4 of Fig. 5 illustrating a modified form of construction; Fig. 5 is an axial section on the line 5—5 of Fig. 4; Fig. 6 is a section on the line 6—6 of Fig. 5; Fig. 7 is an end elevation of the device; Fig. 8 is a side elevation of a planet-pinion mounting; Fig. 9 is a fragmental isometric view illustrating a detail of construction; and Fig. 10 is a fragmental view similar to Fig. 5, but on an enlarged scale.

The device illustrated in Figs. 1 to 3 comprises a driving member 10 and a driven member 11 co-axial therewith. Rotatable with the driving member 10 is a sun gear 12 which meshes with a set of pinions 13 carried by the driven member 11, and surrounding such pinions and meshing therewith there is a ring gear 14.

The parts mentioned form a planetary gear-set, and may be constructed in any desired manner. I prefer, however, to form the driven planet-carrier 11 of a single piece of metal which has an enlarged body portion 15 bored for the reception of the sun-gear 12 and of a bearing-bushing 16 which receives the inner end of the driven member 10. Slots cut through the wall of the body 15 and leaving between them longitudinally extending ribs 15' provide spaces in which the pinions 13 are respectively located, each of such pinions being rotatable on a shaft 17 supported from the body 15.

The various parts of the gear set are enclosed within a casing mounted for rotation with the driving member 10. As shown, this casing comprises end walls 20 and 21 and an annular body 22 to which such end walls are secured, as by means of screws 23. The end wall 20, as shown, is clamped between inner and outer collars 24 and 25, as by screws 26; and the collar 25 and end-wall 20 are keyed or otherwise fixed to the shaft 10. The end wall 21 is provided with a bearing collar 28 within which is a bearing bushing 29 that receives the shank of the driven member 11. Beyond the bearing collar 28, the driven member 11 may have fixed to it a coupling-member 31 by means of which it may be connected to the driven device.

If desired, a bearing ring 32 may be provided to support the adjacent end of the body 15 of the driven member from a hub on the inner clamping collar 24.

The body 22 of the casing has an internal diameter considerably larger than the external diameter of the ring gear 14. In the annular space between these two members I provide a series of annular plates connected for rotation alternately to the casing-body 22 and the ring gear 14. As is clear from Fig. 2, the inner wall of the casing-body 22 may be provided with one or more longitudinally extending key-ways or slots 35 for the reception of lugs 36 on plates 37. Similarly, the ring gear may be provided with one or more longitudinally extending slots for the reception of lugs or ears 38 on plates 39.

In the assembly, plates 37 and 39 alternate. Each plate of one set of plates is desirably held in fixed position axially of the device. I prefer to so locate in fixed positions the plates 37 which are connected to the casing-body 22 for rotation therewith; and to this end, spacing rings 41, slightly thicker than the plates 39, may be interposed between adjacent plates 37. Conveniently, the plates 37 and spacing rings 41 occupy the space between the end plates 20 and 21 of the casing so that they will be clamped in place when the screws 23 are tightened.

I find it unnecessary to locate the plates 39 axially of the device; as any contact they may have with the plates 37 will be relatively light.

Within the casing 20—21—22, I provide a supply of liquid, conveniently oil, in quantity sufficient to fill the annular space between the sun gear 14 and the casing-body 22. One or more screw-plugs 43 in one of the end walls of the casing may be employed for maintaining the proper supply of liquid within the casing.

In the device described, when a torque is applied to the driving member 10 with the driven member 11 under load, the reaction between the pinions 13 and the ring-gear 14 will tend to rotate the latter in a direction opposite to that of the driving member 10 and casing 20—21—22. The resultant relative rotation of the ring-gear and casing will be opposed by the frictional drag resulting from the presence of liquid between the plates 37 and 39. As a result of this frictional drag a torque will be applied to the driven member 11, tending to rotate that member in the same direction as the driving element 10.

A device of the kind described is suited for interposition between an electric motor of low starting torque and a driven device which presents a relatively high starting load. In such a situation, when the motor is started the driven member 11 remains stationary because of its connection with the driven device; and, as the sun gear 12 and casing 20—21—22 begin to rotate, the ring gear 14 is driven in the reverse direction, causing the plates 37 and 39 to move oppositely through the body of liquid within the casing. The viscosity of the liquid results in a frictional drag between the plates 37 and 39 opposing relative rotation of the two sets of plates and of the casing and the ring gear to which they are respectively connected. Initially, because of the low speed, this drag is relatively slight and results in the imposition of a correspondingly small torque on the driven member 11. As the motor increases in speed, however, the relative speed of the plates 37 and 39 also increases to increase the frictional drag opposing relative rotation between them. Eventually this frictional drag will become sufficient to impose upon the driven member 11 a torque sufficient to start the driven device.

Thereafter, conditions will depend upon the relative speeds of the driving and driven members 10 and 11. If these members are rotating at the same speed, all parts of the device rotate as a unit, and there will be no relative movement between the plates 37 and 38. This condition is possible only when no torque is being transmitted through the device; for, in order that torque may be transmitted, there must be some frictional drag opposing relative rotation of the plates 37 and 39, and no such frictional drag will exist unless those plates are moving relatively to each other. Under normal operating conditions, when a torque is being transmitted, the relative speed of rotation of the plates 37 and 39 will depend upon the magnitude of that torque.

It is to be noted that the casing 20, being rigidly connected with the driving member 10 will rotate whenever that driving member rotates. Thus the body of liquid within the casing will be distributed evenly throughout its periphery as the result of centrifugal force. Moreover, the action of centrifugal force will increase the hydrostatic pressure in the liquid adjacent the inner wall of the casing and will tend to free the peripheral portions of the liquid body from air bubbles which might otherwise interfere with the production of a satisfactory frictional drag between the two sets of plates. As the frictional drag between the two sets of plates has its greatest leverage at the peripheries of the plates, freedom from bubbles over the peripheral regions is of prime importance.

The amount of slippage, or the speed differential, between the driving and driven elements will, with other conditions constant, depend upon the spacing between adjacent plates 37 and 39. The closer such plates are together the less will be the slippage. Since the speed differential between the driving element and the ring gear is always greater than that between the driving and driven elements the fluid brake is more effective and the slippage between the driving and driven elements is less than if the same brake acted directly between the driving and driven elements.

In the modification of my invention illustrated in Figs. 4 to 10, the planetary gear-set is of a common type in which only external gears are used. In this construction, the driving and driven elements are in the form of coaxial gears 45 and 46, respectively, and are interconnected by sets of planet pinions 47—48. The driven gears 46 is larger in diameter than the driving gear 45, so that when the axes of the planet pinions are held in fixed positions the gear-set provides a speed-reducing drive.

The sets of planet pinions 47—48 are rotatably supported from a hollow cylindrical casing 50 which encloses the gear set and which is rotatable relatively to both the driving and driven gears 45 and 46, the casing conveniently being supported from the gears 45 and 46 by bearing bushings 51.

Rotatable with the driven gear 46 is an annular flange 53 which surrounds the planet pinions 47 and 48 and which has a diameter consideradly smaller than the interior diameter of the casing 50. The annular space between the flange 53 and the outer wall of the casing 50 is occupied by a series of annular plates connected for rotation alternately with the casing 50 and the flange 53. As is clear from Fig. 4, the inner wall of the casing 50 may be provided with one or more longitudinally extending keys 55 received within notches in the periphery of plates 56. Similarly, the flange 53 may be provided exteriorly with one or more keys 57 received within notches in plates 58.

In the assembly, the plates 56 and 58 alternate. The plates 58 are smaller in diameter than are the plates 56, and the latter are provided near their peripheries with circumferentially spaced axially extending projections conveniently in the form of an annular series of pins 59 extending through the plates 56 outwardly beyond the peripheries of the plates 58. The periphery of each of the plates 58 is notched deeply at intervals with wide V-shaped notches, as indicated at 60, and along the trailing edge of each notch and on each side of the plate there is provided an impeller 61 which may continue obliquely inwardly of the plate to the central opening therein, as is shown in Fig. 4. The impellers 61 slope forwardly and inwardly in the direction of rotation.

The device shown in Figs. 4 to 10 includes means for preventing reverse rotation of the casing 50, which carries the planet-pinions. To this end, I provide a stationary annular ratchet 65 having external teeth which co-operate with one or more inwardly spring-pressed pawls 66 on the casing 50. When the device is embodied in an automobile, the ratchet 65 may be supported from a cross member 67 of the automobile frame through the medium of pins or studs 68. The pawls 66 are desirably so mounted, as shown, that they will fly outwardly out of engagement with the ratchet 65 when the casing 50 is rotating.

In the device as so far described, the imposition of a clockwise-directed torque on the driving gear 45 will impose a correspondingly directed torque on the driven gear 46 and an oppositely directed torque on the casing 50. Since the casing 50 is prevented from rotating in a counterclockwise direction by the ratchet 65, the driven gear is forced to rotate in a clockwise direction at a reduced speed. The plates 58 rotate with the driven gear 46; and as they pass through the liquid within the casing 50, the impellers 61 direct that liquid against the counterclockwise faces of the pins 59, thus tending to rotate the plates 56 and the casing 50 in a clockwise direction. This tendency increases with the speed of the driven gear, and eventually becomes sufficient to overcome the opposite tendency imparted to the casing 50 through the pinions 47—48. When this occurs, the casing 50 begins to rotate, such rotation being permitted by the pawls 66. As speed continues to increase, the torque applied to the casing 50 by the effect of the fluid within it also increases until eventually a condition is attained where the speed differential between the driving and driven elements is substantially insignificant, as in the case of the device illustrated in Figs. 1 to 3.

To prevent the existence of even that slight speed-differential between the driving and driven elements 45 and 46 after a predetermined speed has been attained, I may incorporate in the device a speed-responsive clutch which operates between any two of the three elements of the gear-set to provide, when engaged, a direct drive. In Figs. 4 to 10, I have illustrated a type of clutch which has proven satisfactory in service and which takes the form of a plurality of segmental weights or shoes 70 which rotate with the driven element 46 and which, upon the attainment of a predetermined speed, frictionally engage the inner surface of the casing 50 with a force sufficient to prevent relative movement between the driving element 46 and the casing 50.

As shown in the drawings, the segmental shoes are disposed between two of the plates 58, each shoe being provided with a centrally located pin 71 which projects axially beyond the side faces of the shoe into radial slots 72 in the adjacent plates 58. The slots permit such radial movement of the shoes as is necessary to cause their engagement with and disengagement from the inner surface of the casing 50.

When the speed-responsive clutch is employed, the device operates as above described until the driving element 46 and the shoes 70 attain a speed such that the shoes come into clutching engagement with the inner surface of the casing. Until that speed is attained, the oil film between the shoes and the casing prevents the transference of any substantial torque from the shoes to the casing, or vice versa. I have found that the speed at which the oil film breaks down to permit clutching engagement of the shoes with the casing is fairly well defined for any given oil. I find further that the speed at which the shoes come into clutching engagement with the casing can be controlled by providing the outer surface of each of the shoes 70 with oil-grooves 74 and by varying the number and cross-sectional area of such grooves. Increasing the aggregate cross-sectional area of the grooves, either by increasing their number or their size, tends to decrease the speed at which the shoes 70 exert their clutching action on the casing 50.

To prevent the shoes 70 from undue movement which might cause undesirable noise, each of them may be forced lightly outward, or toward engagement with the casing 50, as by means of a centrally disposed compression spring 75. Each spring 75 exerts on its associated shoe a force which is slightly greater than the weight of the shoe; so that the shoes never tend to fall inwardly.

When a device of the type illustrated in Figs. 4 to 10 is incorporated in an automobile, clearances between the relatively rotatable elements in the oil-containing space are desirably so arranged that the fluid-braking action exerted between the driven element 46 and the casing 50 will become sufficient, at about 15 miles per hour, to overcome the tendency of the casing to rotate rearwardly; and the grooves 74 are so proportioned that the shoes 70 will come into clutching engagement with the casing 50 at about 25 miles per hour. With the parts so proportioned, the device will provide a speed-reducing drive with an accompanying positive mechanical advantage at all automobile speeds below 15 miles per hour; but as the speed increases beyond 15 miles per hour the fluid-braking action will become sufficient to cause the casing 50 to begin to rotate; and thereupon the speed-reduction which the device provides will begin to decrease, and the speed of the driven member 46 will gradually approach the speed of the driving member 45. At about 25 miles per hour, the centrifugal force acting on the shoes 70 will become sufficient to break down the oil film between the shoes and the casing, the shoes will enter into clutching engagement with the casing, and the driven element 46 and driving element 45 will rotate at the same speed.

The exact speed at which the shoes 70 come into clutching engagement with the casing 50 depends to an extent upon the speed-differential between the driven element 46 and the casing. If that speed differential is relatively low, the shoes 70 will exert their clutching action at a lower speed than if the speed differential is high. As a result, the device will pass from a speed-reducing to a direct-drive condition at a lower car speed when the engine is rotating slowly than it will when the engine is rotating rapidly Upon deceleration, the shoes 70 will remain in clutching engagement with the casing 50 at speeds considerably lower than that required to cause their engagement with the casing 50. This is of advantage; as the average automobile driver, when the automobile is once in direct drive, will leave it in direct drive at speeds below that at which, when accelerating, he would go into the direct drive.

I claim as my invention:

1. In a power-transmission mechanism, a rotatable circular casing adapted to contain a supply of liquid lubricant, a member coaxial with said casing and rotatable relatively thereto, fluid clutch means comprising a plurality of plates disposed within said casing, adjacent ones of said plates being connected respectively to said casing and to said member and having opposed, closely spaced surfaces exposed to said lubricant, and a speed-responsive clutch comprising a plurality of shoes rotatable with said member and radially movable into engagement with the inner peripheral surface of said casing under the influence of centrifugal force, the casing-engaging faces of said shoes being grooved to facilitate the escape of lubricant from the space between the shoes and casing.

2. In a power-transmission mechanism, a rotatable circular casing adapted to contain a supply of liquid lubricant, a member coaxial with said casing and rotatable relatively thereto, fluid clutch means comprising a plurality of plates disposed within said casing, said plates being connected alternately to said casing and to said member, some of said plates being provided with obliquely disposed ribs inclined to throw lubricant radially outwardly as they revolve, and plates adjacent to the last mentioned plates being provided with projections positioned to be struck by such outwardly-thrown lubricant.

ARTHUR E. KRICK.